United States Patent [19]

Shimoda et al.

[11] Patent Number: 5,201,155
[45] Date of Patent: Apr. 13, 1993

[54] SEISMIC ISOLATING BEARING

[75] Inventors: Ikuo Shimoda; Masayoshi Ikenaga; Kouske Sasaki, all of Kanagawa, Japan

[73] Assignee: Oiles Corporation, Tokyo, Japan

[21] Appl. No.: 770,929

[22] Filed: Oct. 4, 1991

[30] Foreign Application Priority Data

Oct. 17, 1990 [JP] Japan .................................. 2-108892
Mar. 18, 1991 [JP] Japan .................................. 3-78596

[51] Int. Cl.$^5$ .............................................. E04B 1/98
[52] U.S. Cl. .............................. 52/167 E; 52/167 EA; 248/634
[58] Field of Search .............. 52/167 E, 167 EA, 573; 248/634, 635

[56] References Cited

U.S. PATENT DOCUMENTS

| | | |
|---|---|---|
| 4,117,637 | 10/1978 | Robinson . |
| 4,499,694 | 2/1985 | Buckle et al. ............ 52/167 E |
| 4,593,502 | 6/1986 | Buckle ........................ 52/167 E |
| 4,599,834 | 7/1986 | Fujimoto et al. ............ 52/167 EA |
| 4,633,628 | 1/1987 | Mostaghel .................. 52/167 E |

FOREIGN PATENT DOCUMENTS 519818 12/1955 Canada .............................. 248/634

Primary Examiner—James L. Ridgill, Jr.
Attorney, Agent, or Firm—Sandler, Greenblum & Bernstein

[57] ABSTRACT

A seismic isolating bearing for supporting a building on a foundation includes a laminated body adapted to be interposed vertically between the upper and lower structures. The laminated body comprises alternately arranged viscoelastic layers and stiffener plates, having a hole defined vertically therein, and an energy absorber assembly disposed in the hole, for absorbing energy applied thereto. The energy absorber assembly comprises a lead block inserted in the hole, with the lead block having an intermediate portion held against an inner circumferential surface of the hole. The energy absorber assembly also has a viscoelastic cylindrical body disposed between an outer circumferential surface of at least one of upper and lower end portions of the lead block and the inner circumferential surface of the hole.

12 Claims, 3 Drawing Sheets

SEISMIC ISOLATING BEARING

BACKGROUND OF THE INVENTION

1. Field of the Invention

The present invention relates to a seismic isolating bearing for supporting a structural body for protection against earthquakes, and more particularly to a seismic isolating bearing for isolating a wide variety of vibrational energies ranging from minor vibrations induced by road traffic to medium- and large-scale earthquake vibrations.

2. Description of the Related Art

Various seismic isolating bearings for use between structural bodies, such as between buildings and the ground have been proposed to protect the structural bodies against earthquakes and other vibrations.

One typical seismic isolating bearing comprises a laminated body for supporting vertical loads, the laminated body comprising viscoelastic layers and stiffener plates that are alternately arranged in a vertical direction.

The laminated body has a first coupling on its lower end for coupling the laminated body to a member fixed to a foundation on the ground, and a second coupling, on its upper end, for coupling the laminated body to a structural body that is to be supported.

The laminated body also has a vertical central hole in which there is fitted a cylindrical lead block which is complementary in shape to the central hole. The lead block serves as an energy absorber.

Operation of the conventional seismic isolating bearing will be described below. If the lead block were dispensed with, the laminated body would function as follows:

When the first coupling would move horizontally with respect to the second coupling due to an earthquake, the laminated body would allow such a horizontal movement to a considerable extent through its own elastic deformation (shearing deformation).

In building applications, such a seismic isolating bearing, with no lead block, would be effective and useful to some extent. However, the laminated body would be substantially deformed under the pressure of strong winds applied to the building. With respect to a more serious problem, since the elastic energy of the laminated body can be stored, it would possibly permit greater vibrations to be applied to the building, which the laminated body supports, when an earthquake occurs than to buildings that are fixed directly to ground, resulting in larger damage to the building.

The above problems are solved when the laminated body is combined with the lead block.

The lead block bears the wind-induced load applied to the building for protecting the laminated body against shearing elastic deformation. When a relatively strong earthquake occurs, the lead block is plastically deformed itself, dissipating a portion of the applied earthquake energy as thermal energy. In this sense, the lead block serves as an energy absorber.

The function of the laminated body as an elastic support and the function of the lead block as an energy absorber are combined with each other for high isolating performance.

However, it is known that the physical properties of the lead block vary upon repeated elastic deformation, resulting in deterioration of its function as an energy absorber.

To determine configurations and dimensions of a lead block, therefore, it is necessary to design the lead block so that it will perform the best function as an energy absorber under most critical conditions.

More specifically, the lead block is required, from a design standpoint, that it be elastically deformed only when it is hit by a relatively strong earthquake, i.e., the lead block should be thick and sturdy.

Seismic isolating bearings capable of functioning effectively, without fail, against large vibrations induced by strong earthquakes and also smaller vibrations with relatively weak vibrational accelerations caused by relatively weak earthquakes, heavy traffic conditions, and the like, should be highly useful.

However, since the highly rigid lead block cannot be deformed by weak vibrational accelerations, the conventional seismic isolating bearing is not effective to absorb vibrations induced by relatively weak earthquakes.

Another problem is that the equivalent stiffness of the conventional seismic isolating bearing does not match medium vibrations caused by medium-scale earthquakes.

The amount of plastic deformation that the lead block undergoes when subjected to medium vibrations is smaller than that which is induced by large vibrations caused by stronger earthquakes. Therefore, the equivalent stiffness of the seismic isolating bearing against medium vibrations is larger than against large vibrations.

Inasmuch as the equivalent stiffness of the seismic isolating bearing is established to match strong earthquakes, it is too high for medium vibrations. Therefore, the natural period of vibration of the system, which is composed of the building and the seismic isolating bearing, is too short to isolate the building from medium-scale earthquakes.

SUMMARY OF THE INVENTION

In view of the aforesaid drawbacks of the conventional seismic isolating bearing, it is an object of the present invention to provide a seismic isolating bearing capable of isolating a wide variety of vibrations ranging from minor vibrations induced by road traffic to large-scale earthquake vibrations.

According to the present invention, there is provided a seismic isolating bearing for supporting an upper structure on a lower structure, comprising a laminated body adapted to be interposed vertically between the upper and lower structures, the laminated body comprising alternately arranged viscoelastic layers and stiffener plates, and having a hole defined vertically therein, and an energy absorbing device disposed in the hole, for absorbing energy applied thereto. The energy absorbing device comprises a lead block inserted in the hole, with the lead block having an intermediate portion held against an inner circumferential surface of the hole. The energy absorbing device also comprises a viscoelastic cylindrical body disposed between an outer circumferential surface of at least one of upper and lower end portions of the lead block and the inner circumferential surface of the hole.

When relatively small horizontal vibrations induced by weak traffic vibrations or relatively weak earthquakes are applied to the seismic isolating bearing, shearing deformations are produced in the laminated body near the ends thereof, and the applied vibrational energy is absorbed by deformation of the viscoelastic cylindrical body of the energy absorbing device.

When medium horizontal vibrations induced by medium-scale earthquakes are applied to the seismic isolating bearing, greater shearing deformations are produced in the laminated body near the ends thereof, and most of the shearing deformations in the laminated body are absorbed by the viscoelastic cylindrical body of the energy absorbing device. The remainder of the shearing deformations is transmitted to the lead block, which absorbs the applied energy.

When relatively large horizontal vibrations induced by large-scale earthquakes are applied to the seismic isolating bearing, much greater shearing deformations are produced in the laminated body near the ends thereof, and the laminated body is greatly deformed in its entirety by the shearing deformations. Only a small proportion of the shearing deformations in the laminated body is absorbed by the viscoelastic cYlindrical body of the energy absorbing device. The remainder of the shearing deformations is transmitted to the lead block, which is plastically deformed to absorb the applied large amount of energy.

The seismic isolating bearing is capable of absorbing or damping various types of vibrations with a wide range of intensities. The ability of the lead block to absorb applied vibrational energy is prevented from being degraded by frequently applied small vibrations.

The viscoelastic cylindrical body of the energy absorbing means may have a plurality of vertical grooves to provide a nonlinear spring constant for good isolating capabilities against a wide variety of vibrations ranging from small vibrations to vibrations induced in medium- and large-scale earthquakes.

At least one of upper and lower end portions of the lead block may have a smaller-diameter portion which is smaller in cross section than the intermediate portion of the lead block, the viscoelastic cylindrical body of the energy absorbing device being interposed between an outer circumferential surface of the smaller-diameter portion and the inner circumferential surface of the hole.

At least one of upper and lower end portions of the lead block may have a conical surface progressively smaller in diameter toward an end thereof, and the viscoelastic cylindrical body of the energy absorbing device, which is held against the conical surface, may be progressively thicker in complementary relationship to the conical surface.

The hole may have upper and lower end portions, at least one of the upper and lower end portions of the hole being larger in diameter than an intermediate portion thereof. The viscoelastic cylindrical body of the energy absorbing device may be interposed between an inner circumferential surface of the larger-diameter end portion of the hole and the outer circumferential surface of the lead block.

The viscoelastic layers of the laminated body include those viscoelastic layers which positionally correspond to the viscoelastic cylindrical body of the energy absorbing device and which are made of a smaller modulus of static shear elasticity than the modulus of static shear elasticity of the other viscoelastic layers of the laminated body.

The lead block may have a hole defined in at least one of the upper and lower ends thereof, with the energy absorbing device further comprising a laminated body composed alternately arranged viscoelastic layers and stiffener plates and disposed in the hole in the lead block.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

Figure 1:
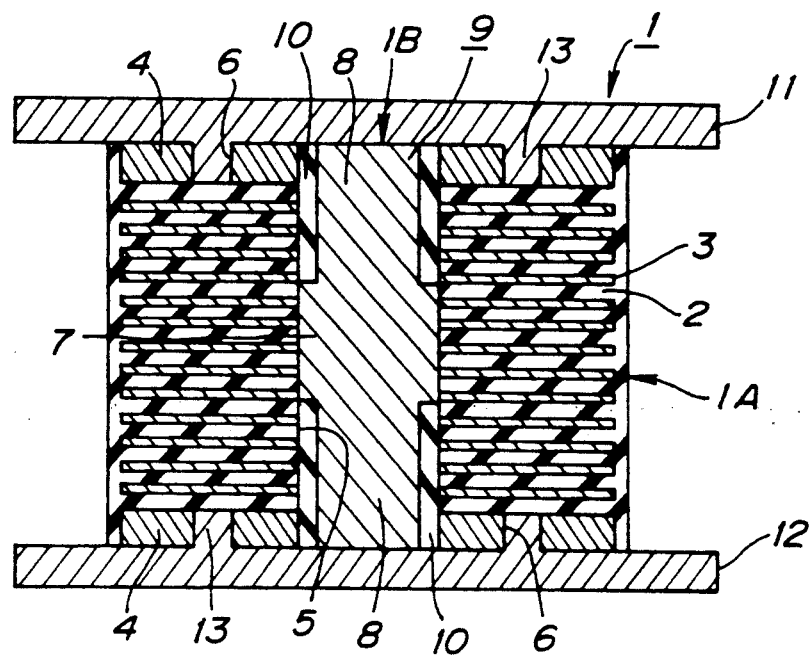
FIG. 1 is a vertical cross-sectional view of a seismic isolating bearing according to a first embodiment of the present invention.

Like or corresponding parts are denoted by like or corresponding reference characters throughout views.

FIG. 1 shows a seismic isolating bearing according to a first embodiment of the present invention.

The seismic isolating bearing, generally designated by the reference numeral 1, comprises a cylindrical laminated body 1A, and an energy absorber assembly 1B disposed in the laminated body 1A.

The laminated body 1A comprises viscoelastic layers 2 and stiffener steel plates 3 that are alternately arranged in the vertical direction. Thicker steel plates 4 are integrally joined to the upper and lower ends, respectively, of the laminated body 1A by vulcanization. The laminated body 1A has a vertical circular hole 5 defined centrally therethrough.

The energy absorber assembly 1B comprises a lead block 9 and viscoelastic cylindrical bodies 10.

The lead block 9, which is essentially cylindrical in shape, comprises a larger-diameter portion 7 snugly fitted in the circular hole 5 and smaller-diameter porsions 8 on axially opposite ends of the larger-diameter portion 7. Each of the viscoelastic cylindrical bodies 10 is of a tubular configuration.

The lead block 9 is inserted in the circular hole 5 with the outer circumferential surface of the lead block 9 being held against the inner circumferential surface of the circular hole 5. The tubular viscoelastic cylindrical bodies 10 are inserted between the outer circumferential surfaces of the smaller-diameter portions 8 of the lead block 9 and the corresponding inner circumferential surfaces of the circular hole 5.

The seismic isolating bearing 1 is coupled to upper and lower structures (not shown) through respective upper and lower attachment plates 11, 12 that have a plurality of dowel pins 13.

The upper and lower attachment plates 11, 12 are joined to the laminated body 1A with the dowel pins 13 fitted in respective holes 6 that are defined in the upper and lower thicker steel plates 4 on the upper and lower ends of the laminated body 1A.

In this embodiment, the upper and lower attachment plates 11, 12 and the upper and lower thicker steel plates 4 are joined to each other by the dowel pins 13 fitted in the respective holes 6. However, the upper and lower attachment plates 11, 12 and the upper and lower thicker steel plates 4 may be fastened to each other by bolts and nuts (not shown).

The energy absorber assembly 1B can be assembled into the laminated body 1A as follows: The viscoelastic cylindrical bodies 10 are first fitted over the smaller-diameter portions 8 of the lead block 9, and then the viscoelastic cylindrical bodies 10 and the lead block 9 are fitted into the circular hole 5 in the laminated body 1A. Alternatively, the larger- and smaller-diameter portions 7, 8 of the lead block 9 may be formed separately from each other, and with the viscoelastic cylindrical bodies 10 fitted over the smaller-diameter portions 8, one of the smaller-diameter portions 8, the larger-diameter portion 7, and then the other smaller-diameter portion 8 may successively inserted into the central hole 5 in the laminated body 1A.

The viscoelastic cylindrical bodies 10 may be made of a viscoelastometric material such as ethylene propylene rubber, nitrile rubber, butyl rubber, natural rubber, silicone rubber, polyurethane, or the like, or a combination of such a viscoelastomeric material and a filler such as graphite, carbon black, asphalt, or the like, or a spongy material such as foamed polyurethane or the like.

Operation of the seismic isolating bearing 1 will be described below.

The seismic isolating bearing 1 according to the present invention is particularly, but not necessarily, suitable for use with buildings. Most often, the upper attachment plate 11 is secured to a building, and the lower attachment plate 12 is secured its foundation that is fixed to the ground.

In such applications, it is important to take into account the relationship between horizontal displacements of the lower attachment plate 12 that are induced by external forces due to an earthquake or the like, and resultant horizontal displacements of the upper attachment plate 11.

More specifically, primary consideration should be given to horizontal displacements of the lower attachment plate 12 relative to the upper attachment plate 11, resultant shearing deformations of the laminated body 1A, and any possible plastic deformation of the lead block 9. Such horizontal displacements of the lower attachment plate 12 with respect to the upper attachment plate 11, which will frequently be referred to in the description below, will hereinafter be referred to as "displacements of the lower attachment plate 11" unless specified otherwise. Relatively small horizontal vibrations can be caused by relatively weak earthquakes, traffic vibrations, etc.

Displacements of the lower attachment plate 12 that are induced by such relatively small horizontal vibrations are comparatively small, and cause shearing deformations in upper and lower end portions of the laminated body 1A that positionally correspond to the smaller-diameter portions 8, respectively, of the lead block 9.

The intermediate portion of the laminated body 1A, that corresponds in position to the larger-diameter portion 7 of the lead block 9, is prevented from undergoing shearing deformations because of the stiffness of the larger-diameter portion 7.

Since the shearing deformations produced in the upper and lower end portions of the laminated body 1A are absorbed by deformation of the viscoelastic cylindrical bodies 10 around the smaller-diameter portions 8, the smaller-diameter portions 8 are prevented from being deformed.

The energy absorption is effected by the shearing deformations of the viscoelastic layers 2 of the laminated bodies 1A and the deformation of the viscoelastic cylindrical bodies 10 of the energy absorber assembly 1B, but not by the lead block 9. Though the amount of energy absorbed by these viscoelastic layers 2 and viscoelastic cylindrical bodies 10 is relatively small, it can sufficiently be absorbed because the vibrations applied to induce the energy are small.

The deformation of the viscoelastic cylindrical bodies 10 does not cause the lead block 9 to prevent the laminated body 1A from undergoing shearing deformations. Consequently, the equivalent stiffness of the seismic isolating bearing 1 is not increased by the stiffness of the lead block 9.

The thickness of the viscoelastic cylindrical bodies 10 may be designed principally for the equivalent stiffness of the seismic isolating bearing 1 to have a desired value under the above conditions. According to such design considerations, the seismic isolating bearing 1 has isolating characteristics that well match relatively small vibrations.

Such relatively small vibrations are very often applied to the seismic isolating bearing 1. Since the lead block 9 is not deformed by applied small vibrations, the function of the load block 9 as the energy absorber is not degraded by the applied small vibrations.

Relatively Medium Horizontal Vibrations Caused by Medium-Scale Earthquakes

When displacements of the lower attachment plate 12 are induced by relatively medium horizontal vibrations, the upper and lower end portions of the laminated body 1A are subjected to greater shearing deformations than when displacements of the lower attachment plate 12 are induced by relatively small horizontal vibrations as described above.

Most of such shearing deformations are absorbed by deformation of the viscoelastic cylindrical bodies 10, and the remainder is transmitted to the smaller-diameter portions 8 of the lead block 9, which are thus plastically deformed.

The larger-diameter portion 7 of the lead block 9 is slightly plastically deformed under forces applied thereto from the laminated body 1A and the smaller-diameter portions 8. Because the applied vibrational energy is absorbed by the lead block 9 as well as the viscoelastic layers 2 and the viscoelastic cylindrical bodies 10, the amount of energy that can be absorbed is larger than it is when relatively smaller vibrations are applied.

The contribution of the lead block 9 to the equivalent stiffness of the seismic isolating bearing 1 is maximized when the shearing deformations of the laminated body 1A approximate the amount of deformation of the lead block 9 when the lead block 9 starts to be plastically deformed. Until the laminated body 1A is deformed that much, most of its shearing deformations are absorbed by the deformation of the viscoelastic cylindrical bodies 10, as described above, and hence any increase in the equivalent stiffness of the seismic isolating bearing 1, owing to the lead block 9, is held to minimum. (The equivalent stiffness of the seismic isolating bearing 1 depends on the viscoelasticity of the viscoelastic cylindrical bodies 10 and the viscoelastic layers 2, and varies depending on the vibrational acceleration. The contribution of the viscoelasticity to the equivalent stiffness of the viscoelastic layers 2 and the viscoelastic cylindrical bodies 10 will not be described in detail here as it is smaller than the contribution of the stiffness and plasticity of the lead block 9.) As a result, the seismic isolating bearing 1 has good isolating characteristics with respect to relatively medium vibrations.

Relatively Large Horizontal Vibrations Caused by Relatively Strong Earthquakes

Displacements of the lower attachment plate 12 induced by such relatively large horizontal vibrations are larger than those induced by the small and medium vibrations.

The laminated body 1A undergoes shearing deformations in its entirety. Only a small proportion of the shearing deformations is absorbed by the viscoelastic cylindrical bodies 10, and the remainder is transmitted to the lead block 9.

Therefore, the lead block 9, including its larger-diameter portion 7, is plastically deformed to a large extent, and generates a large amount of heat therein that will be dissipated. Accordingly, the lead block 9 can absorb a very large amount of vibrational energy.

The configurations and dimensions of the lead block 9 may be designed such that the equivalent stiffness of the seismic isolating bearing 1 will have a desired value. As a consequence, the seismic isolating bearing 1 has isolating characteristics that well match relatively large vibrations.

As described above, the seismic isolating bearing 1 is capable of absorbing or damping various types of vibrations having various intensities in a wide range. The ability of the lead block 9 to absorb vibrational energy is prevented from being degraded by frequently applied relatively small vibrations.

Figure 2:
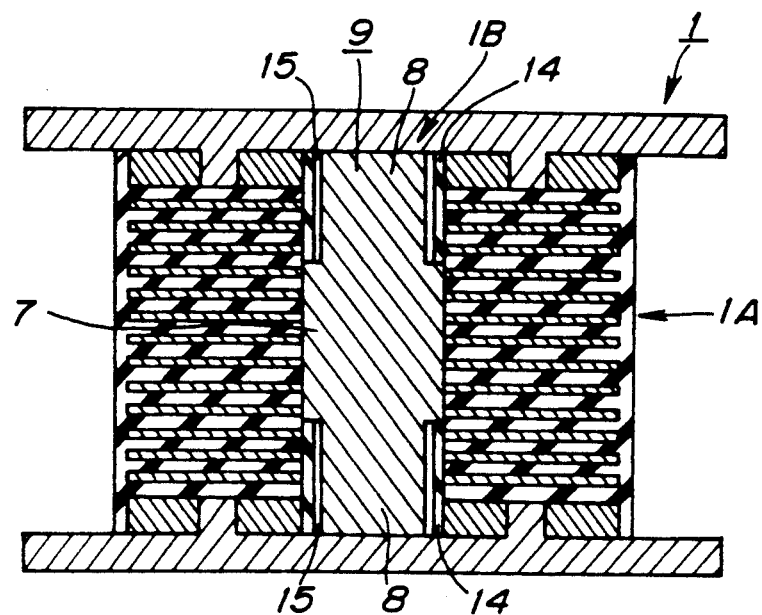
FIG. 2 is a vertical cross-sectional view of a seismic isolating bearing according to a second embodiment of the present invention.
Figure 3:
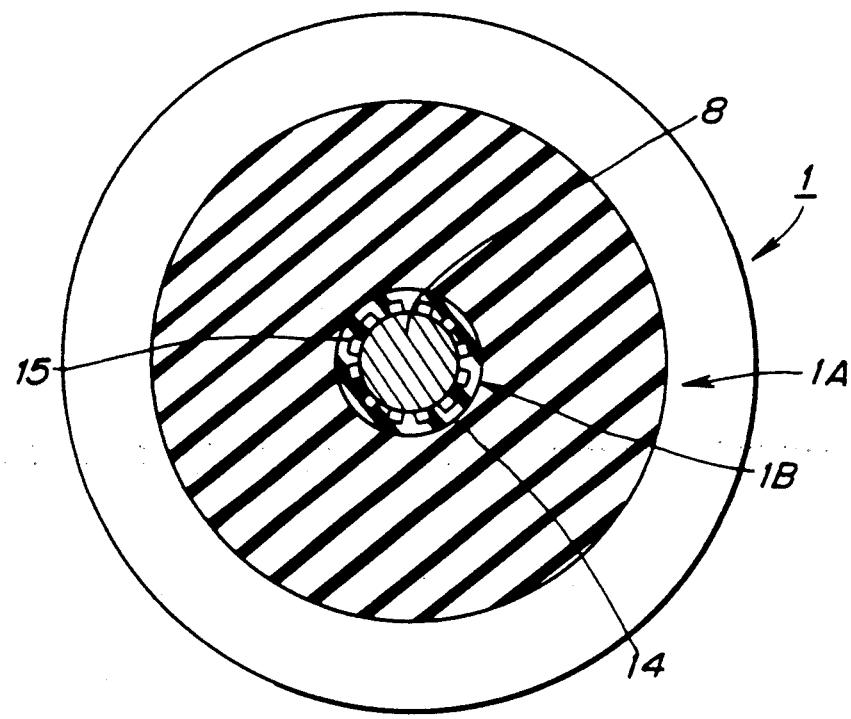
FIG. 3 is a horizontal cross-sectional view of the seismic isolating bearing shown in FIG. 2.

FIGS. 2 and 3 show a seismic isolating bearing according to a second embodiment of the present invention. The seismic isolating bearing, generally denoted at 1, is different from the seismic isolating bearing of the first embodiment with respect to the configurations of viscoelastic cylindrical bodies 14 of the energy absorber assembly 1B.

As shown in FIGS. 2 and 3, each of the viscoelastic cylindrical bodies 14, which is of a tubular shape, has a plurality of vertical grooves 15 defined in an inner circumferential surface and spaced at circumferential intervals.

When the deformation of the viscoelastic cylindrical bodies 14, caused by shearing deformations of the laminated body 1A, is relatively small, the voids of the grooves 15 are crushed, and hence the spring constant of the viscoelastic cylindrical bodies 14 is maintained at a small value.

When the laminated body 1A is subjected to greater shearing deformations and the voids are fully crushed, the spring constant of the viscoelastic cylindrical bodies 14 has a larger value.

As described above, the spring constant of the viscoelastic cylindrical bodies 14 has different values when their deformation is smaller and larger, and is substantially nonlinear with respect to the deformation of the viscoelastic cylindrical bodies 14.

When the deformation of the viscoelastic cylindrical bodies 14 is smaller, the spring constant thereof is smaller. Therefore, the period of the natural frequency of smaller vibrations of the system, that is composed of the seismic isolating bearing 1 and the building or structure supported thereby, can be increased. The seismic isolating bearing 1, according to the second embodiment, is thus suitable to applications that isolate the building or structure from externally applied small vibrations of shorter periods. Small vibrations of longer periods are negligible as they generally have small effects on the building or structure that is supported by the seismic isolating bearing 1.

Figure 4:
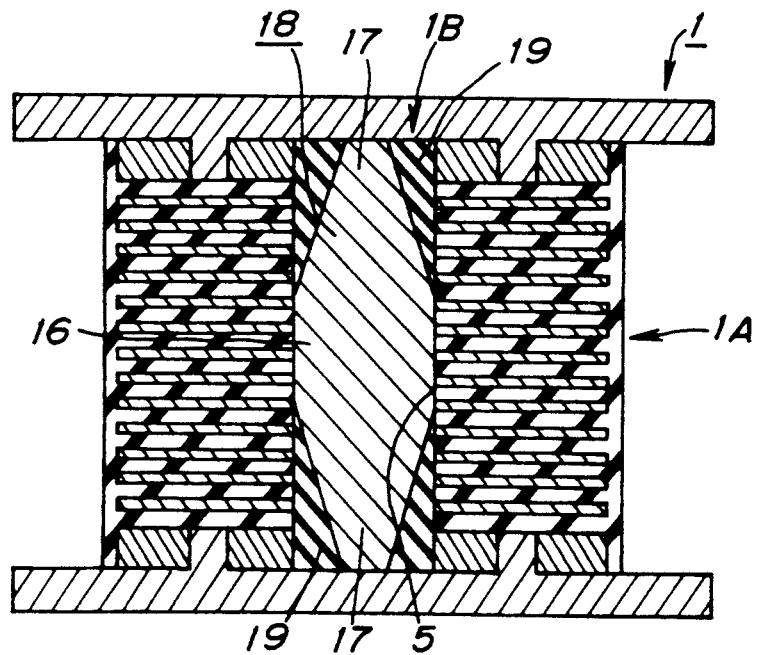
FIG. 4 is a vertical cross-sectional view of a seismic isolating bearing according to a third embodiment of the present invention.

FIG. 4 shows a seismic isolating bearing, generally denoted at 1, according to a third embodiment of the present invention. The seismic isolating bearing 1, as shown in FIG. 4, differs from the seismic isolating bearing 1 of the first embodiment as to the structure of the energy absorber assembly 1B.

The energy absorber assembly 1B, according to the third embodiment, comprises a lead block 18 having an intermediate larger-diameter portion 16 and smaller-diameter conical portions 17 on opposite sides of the larger-diameter portions 16, with the conical portions 17 being progressively smaller in diameter toward the upper and lower ends of the lead block 18. The energy absorber assembly 1B further comprises viscoelastic cylindrical bodies 19 fitted respectively over the smaller-diameter conical portions 17, with the viscoelastic cylindricalbodies 19 being progressively thicker toward the upper and lower ends of the lead block 18 in complementary relationship to the smaller-diameter conical portions 17.

The deformation of the viscoelastic cylindrical bodies 19, that is induced by shearing deformations of the laminated body 1A, is pregressively greater toward the ends of the laminated body 1A. Since the thickness of the viscoelastic cylindrical bodies 19 is progressively larger toward the ends of the laminated body 1A, the function of the viscoelastic cylindrical bodies 19 can be performed to a maximum extent.

A seismic isolating bearing 1, according to a fourth embodiment of the present invention, will be described below with reference to FIG. 5.

The seismic isolating bearing 1 includes an energy absorber assembly 1B comprising a cylindrical lead block 21 having a uniform circular cross section throughout in the vertical direction, and annular viscoelastic cylindrical bodies 22 disposed around upper and lower end portions, respectively, of the lead block 21.

The seismic isolating bearing 1 also includes a cylindrical laminated body 1A having a central circular hole 5 that includes upper and lower larger-diameter portions 23. The lead block 21 is inserted in the circular hole 5 with its intermediate portion held against the inner circumferential surface of the hole 5, and the viscoelastic cylindrical bodies 22 are disposed between the outer circumferential surfaces of the upper and lower end portions of the lead block 21 and the inner circumferential surfaces of the larger-diameter portions 23 of the circular hole 5. The laminated body 1A has viscoelastic layers 2 that are made of different types of rubber in axially divided regions A, B. The regions A positionally correspond to the viscoelastic cylindrical bodies 22, and the region B is positioned axially between the regions A and corresponds in position to an intermediate region of the lead block 21 that is free from the viscoelastic cylindrical bodies 22. The viscoelastic layers 2 in the regions A are made of softer rubber having a modulus of static shear elasticity of 6 Kgf/cm$^2$, and the viscoelastic layers 2 in the region B are made of harder rubber having a modulus of static shear elasticity of 8 Kgf/cm$^2$.

The viscoelastic cylindrical bodies 22 of the energy absorber assembly 1B may be inserted separately in the larger-diameter portions 23, or may be integrally formed when the laminated body 1A is vulcanized.

In the fourth embodiment, since the viscoelastic members 2 in the regions A are made of softer rubber having a smaller modulus of static shear elasticity, the equivalent stiffness of the seismic isolating bearing 1, with respect to relatively small vibrations applied thereto, is small. Therefore, the seismic isolating bearing 1, according to the fourth embodiment, has good isolating characteristics particularly against small vibrations, as with the second and third embodiments.

Figure 6:
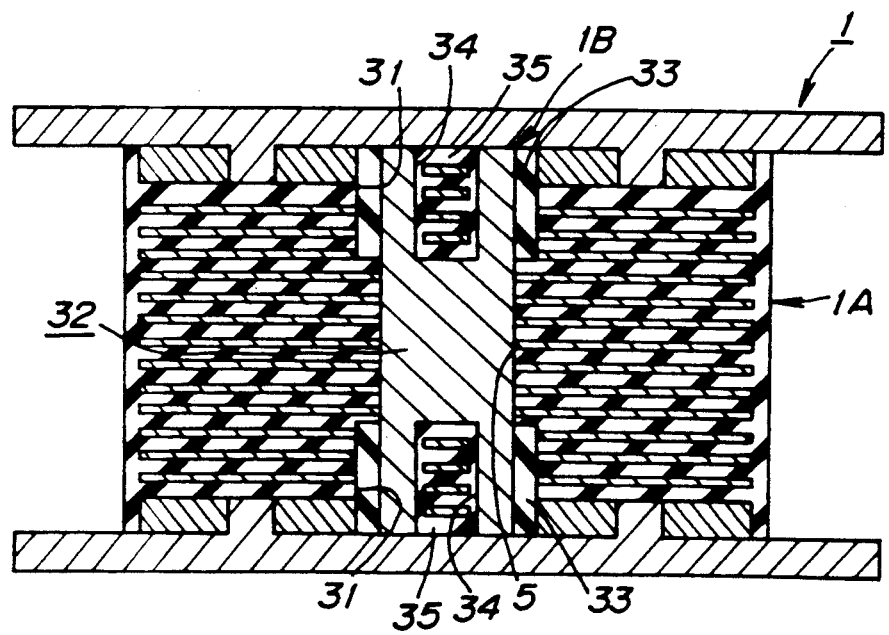
FIG. 6 is a vertical cross-sectional view of a seismic isolating bearing according to a fifth embodiment of the present invention.

FIG. 6 illustrates a seismic isolating bearing 1 according to a fifth embodiment of the present invention.

In the fifth embodiment, the central circular hole 5 of the laminated body 1A has larger-diameter portions 31 in its upper and lower end portions. Viscoelastic cylindrical bodies 33 are disposed between the outer circumferential surfaces of the upper and lower end portions of a cylindrical lead block 32 and the inner circumferential surfaces of the larger-diameter portions 31 of the circular hole 5. The cylindrical lead block 32 has cylindrical holes or spaces 34 defined in its respective upper and lower end portions and extending vertically along the axis of the lead block 32. A laminated body 35 composed of alternate viscoelastic layers and stiffener steel plates is disposed in each of the spaces 34.

Figure 5:
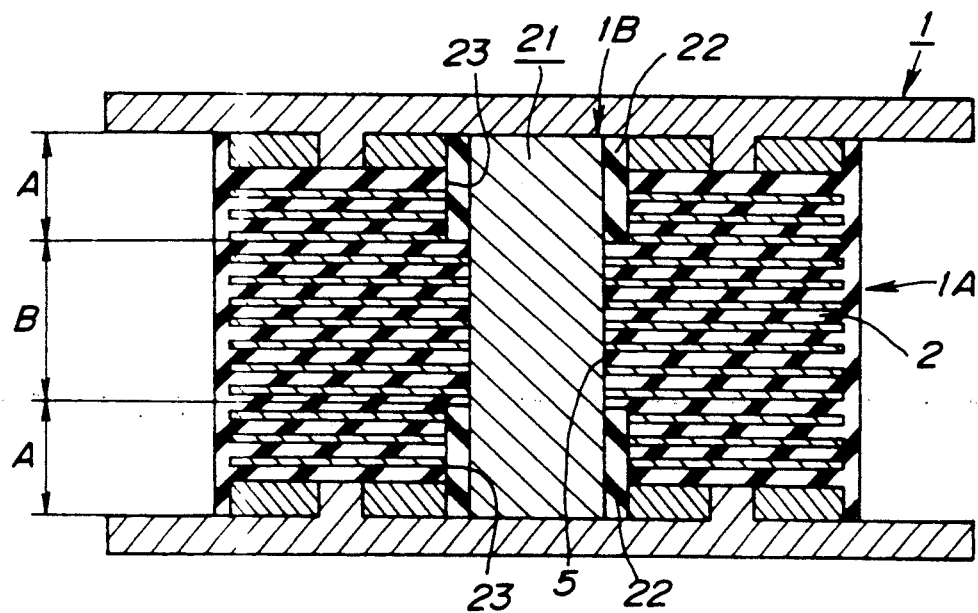
FIG. 5 is a vertical cross-sectional view of a seismic isolating bearing according to a fourth embodiment of the present invention.

When medium vibrations induced by medium-scale earthquakes are applied, the opposite ends of the lead block 32 are more easily deformable than the opposite ends of the lead block 21, as shown FIG. 5.

The dimensions of the laminated bodies 35 may be determined to optimize the seismic isolating bearing 1 with respect to medium vibrations. Consequently, the seismic isolating bearing 1, according to the fifth embodiment, provides good isolating characteristics against a wide range of vibrations.

In the illustrated embodiments, the viscoelastic cylindrical bodies are disposed around both the upper and lower end portions of the lead block. However, the viscoelastic cylindrical bodies can also be disposed around the upper or lower end portion of the lead block.

Although certain preferred embodiments of the present invention have been shown and described in detail, it should be understood that various changes and modifications may be made therein without departing from the scope of the appended claims.

What is claimed is:

1. A seismic isolating bearing for supporting an upper structure on a lower structure, comprising:
   a laminated body adapted to be interposed vertically between the upper and lower structures, said laminated body comprising alternately arranged viscoelastic layers and stiffener plates, and having a hole defined vertically therein;
   energy absorbing means disposed in said hole, for absorbing energy applied thereto;
   said energyabsorbing means comprising a lead block inserted in said hole, said lead block having an intermediate portion held against an inner circumferential surface of said hole; and
   said energy absorbing means also comprising a viscoelastic cylindrical body disposed between an outer circumferential surface of at least one of upper and lower end portions of said lead block and the inner circumferential surface of said hole.

2. A seismic isolating bearing according to claim 1, wherein said at least one of upper and lower end portions of said lead block has a smaller-diameter portion which is smaller in cross section than said intermediate portion of the lead block, said viscoelastic cylindrical body of said energy absorbing means being interposed between an outer circumferential surface of said smaller-diameter portion and the inner circumferential surface of said hole.

3. A seismic isolating bearing according to claim 1, wherein said at least one of upper and lower end portions of said lead block has a conical surface progressively smaller in diameter toward an end thereof, said viscoelastic cylindrical body of said energy absorbing means being interposed between said conical surface and the inner circumferential surface of said hole.

4. A seismic isolating bearing according to claim 1, wherein said hole has upper and lower end portions, at least one of said upper and lower end portions of said hole being larger in diameter than an intermediate portion thereof, said viscoelastic cylindrical body of said energy absorbing means being interposed between an inner circumferential surface of said one of said upper and lower end portions of said hole and the outer circumferential surface of said lead block.

5. A seismic isolating bearing according to claim 1, wherein said viscoelastic layers of said laminated body include said viscoelastic layers which positionally correspond to said viscoelastic cylindrical body of said energy absorbing means and which are made of a smaller modulus of static shear elasticity than the modulus of static shear elasticity of said other viscoelastic layers of said laminated body.

6. A seismic isolating bearing according to claim 1, wherein said lead block has a hole defined in said at least one of the upper and lower ends thereof, said energy absorbing means further comprising a laminated body composed of alternately arranged viscoelastic layers and stiffener plates and disposed in said hole in said lead block.

7. A seismic isolating bearing according to claim 1, wherein said hole in said laminated body is defined vertically therethrough in a central portion thereof.

8. A seismic isolating bearing according to claim 1, further including an upper attachment plate for attaching said laminated body to the upper structure, and a lower attachment plate for attaching said laminated body to the lower structure, said lead block being coupled to and disposed between said upper and lower attachment plates.

9. A seismic isolating bearing according to claim 1, wherein said viscoelastic cylindrical body of said energy absorbing means has a nonlinear spring constant.

10. A seismic isolating bearing according to claim 9, wherein said at least one of upper and lower end portions of said lead block has a smaller-diameter portion which is smaller in cross-section than said intermediate portion of said lead block, said viscoelastic cylindrical body of said energy absorbing means being interposed between an outer circumferential surface of said smaller-diameter portion and the inner circumferential surface of said hole.

11. A seismic isolating bearing according to claim 9, wherein said at least one of upper and lower end portions of said lead block has a conical surface progressively smaller in diameter toward an end thereof, said viscoelastic cylindrical body of said energy absorbing means being interposed between said conical surface and the inner circumferential surface of said hole.

12. A seismic isolating bearing according to claim 9, wherein said hole has upper and lower end portions, at least one of said upper and lower end portions of said hole being larger in diameter than an intermediate portion thereof, said viscoelastic cylindrical body of said energy absorbing means being interposed between an inner circumferential surface of said one of said upper and lower end portions of said hole and the outer circumferential surface of said lead block.

* * * * *

UNITED STATES PATENT AND TRADEMARK OFFICE
CERTIFICATE OF CORRECTION

PATENT NO. : 5,201,155
DATED : April 13, 1993
INVENTOR(S) : I. SHIMODA et al.

It is certified that error appears in the above-indentified patent and that said Letters Patent is hereby corrected as shown below:

At column 3, line 20, change "cYlindrical" to ---cylindrical---.
At column 4, line 1, insert ---of--- after "composed".
At column 4, lines 51-52, change "porsions" to ---portions---.
At column 5, line 23, insert ---be--- after "may".
At column 5, line 39, insert ---to--- after "secured".
At column 8, line 32, change "cylindricalbodies" to ---cylindrical bodies---.
At column 9, line 67 (claim 1, line 10), change "energyabsorbing" to ---energy absorbing---.

Signed and Sealed this

Twenty-second Day of November, 1994

Attest:

BRUCE LEHMAN

*Attesting Officer*  *Commissioner of Patents and Trademarks*